United States Patent
Crane et al.

(10) Patent No.: US 7,729,240 B1
(45) Date of Patent: Jun. 1, 2010

(54) METHOD AND SYSTEM FOR IDENTIFYING DUPLICATE PACKETS IN FLOW-BASED NETWORK MONITORING SYSTEM

(75) Inventors: Mark E. Crane, Reno, NV (US); Tomas J. Pavel, San Jose, CA (US); Wei Yue, Santa Clara, CA (US)

(73) Assignee: OPNET Technologies, Inc., Bethesda, MD (US)

( * ) Notice: Subject to any disclaimer, the term of this patent is extended or adjusted under 35 U.S.C. 154(b) by 904 days.

(21) Appl. No.: 11/173,752

(22) Filed: Jun. 30, 2005

(51) Int. Cl.
*H04L 1/00* (2006.01)
*H04L 12/56* (2006.01)
*H04J 3/24* (2006.01)
*G06F 15/16* (2006.01)

(52) U.S. Cl. .................. 370/229; 370/392; 370/474; 709/232

(58) Field of Classification Search .................. 370/229, 370/392, 474; 709/232
See application file for complete search history.

(56) References Cited

U.S. PATENT DOCUMENTS

| 6,810,021 | B1 * | 10/2004 | Sakurai ..................... 370/255 |
| 7,362,707 | B2 * | 4/2008 | MeLampy et al. .......... 370/235 |
| 2002/0089933 | A1 * | 7/2002 | Giroux et al. ............... 370/236 |
| 2003/0142666 | A1 * | 7/2003 | Bonney et al. ............. 370/389 |
| 2003/0231596 | A1 * | 12/2003 | Hong ......................... 370/252 |
| 2005/0018668 | A1 * | 1/2005 | Cheriton ..................... 370/389 |
| 2005/0105474 | A1 * | 5/2005 | Metzler ...................... 370/252 |
| 2005/0175007 | A1 * | 8/2005 | Park et al. ................... 370/390 |
| 2005/0243824 | A1 * | 11/2005 | Abbazia et al. ............. 370/390 |
| 2006/0159098 | A1 * | 7/2006 | Munson et al. ............. 370/394 |

* cited by examiner

*Primary Examiner*—Dang T Ton
*Assistant Examiner*—Ryan C Kavleski
(74) *Attorney, Agent, or Firm*—Robert M. McDermott, Esq.

(57) ABSTRACT

A network monitoring device configured to collect a new packet from one or more observation points of a network and to compare the new packet with a list of a number of received packets based on a packet arrival rate and to identify a duplicate packet. In particular, the number of received packets in the list is equivalent to a number of packets received within a time period, i.e. the packet arrival rate. Stated differently, the network monitoring device is to compare the new packets with received packets stored in a queue of a buffer and wherein the queue has a size based on a packet arrival rate collected at one or more observation points. In addition, the time period is further adjusted according to a threshold value. The threshold value is a variable parameter that can be adjusted to compensate for different network deployment. In one embodiment, the threshold value is a time value that is not more than a transmission time of a TCP retransmitted packet.

26 Claims, 2 Drawing Sheets

US 7,729,240 B1

METHOD AND SYSTEM FOR IDENTIFYING DUPLICATE PACKETS IN FLOW-BASED NETWORK MONITORING SYSTEM

FIELD OF THE INVENTION

The present invention relates to a method and system for identifying duplicate packets in a communication network based on packets characteristics, such as data transmission time and packet header information.

BACKGROUND

Today, information technology professionals often encounter myriad different problems and challenges during the operation of a computer network or network of networks. For example, these individuals must often cope with network device failures and/or software application errors brought about by causes such as configuration errors. In order to permit network operators and managers to track down the sources of such problems, network monitoring devices capable of recording and logging vast amounts of information concerning network communications have been developed.

Conventional network monitoring devices, however, suffer from scalability problems. For example, these devices are generally limited in the number of applications they can monitor and the number of locations they can monitor from, since the deployment and management of the required agents are both expensive and time-consuming. For this reason, flow-based network monitoring has been developed. Basically, a flow is an end-to-end TCP (Transmission Control Protocol) or UDP (User Datagram Protocol) conversation across any IP network type, between entities such as application, server and client. Flows can be monitored by aggregating the data from TCP/IP packet headers as they pass through a data aggregation point, via a spanning port or tap. By itself, this flow data supplies detailed information on performance and utilization.

However, multiple copies of identical packets may be acquired when implementing such network monitoring devices. These duplicate copies are frequently created by collecting packets at multiple monitoring points of the flow. These duplicate packets contribute to errors in network performance and utilization analyses. Therefore, it is important that these duplicate packets be removed or their instances minimized.

Common algorithms for identifying duplicate packets include ones for comparing a new packet with a list of existing packets. However, the selection of existing packets is frequently based on a fixed queue length of a packet buffer. Relevant packets may be missed because the list of what should be considered relevant packets exceeds the fixed queue length. Indeed, the number of packets per second presented to a network monitoring system may vary greatly from site to site and even day to day. For example, a highly utilized network may present more packets per second compared to a less utilized network. It is therefore a challenge to retrieve the appropriate packets for comparison. The present invention addresses these needs.

SUMMARY OF THE INVENTION

A network system configured in accordance with one embodiment of the present invention includes a network monitoring device configured to collect a new packet from one or more observation points of a network and to compare the new packet with a list of a number of received packets based on a packet arrival rate and to identify a duplicate packet. In particular, the number of received packets in the list is equivalent to a number of packets received within a time period, i.e. the packet arrival rate. Stated differently, the network monitoring device is to compare the new packets with received packets stored in a queue and wherein the queue has a size based on a packet arrival rate collected at one or more observation points. In addition, the time period is further adjusted according to a threshold value. The threshold value is a variable parameter that can be adjusted to compensate for different network deployment. In one embodiment, the threshold value is a time value that is not more than a transmission time of a TCP retransmitted packet.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Figure 1:
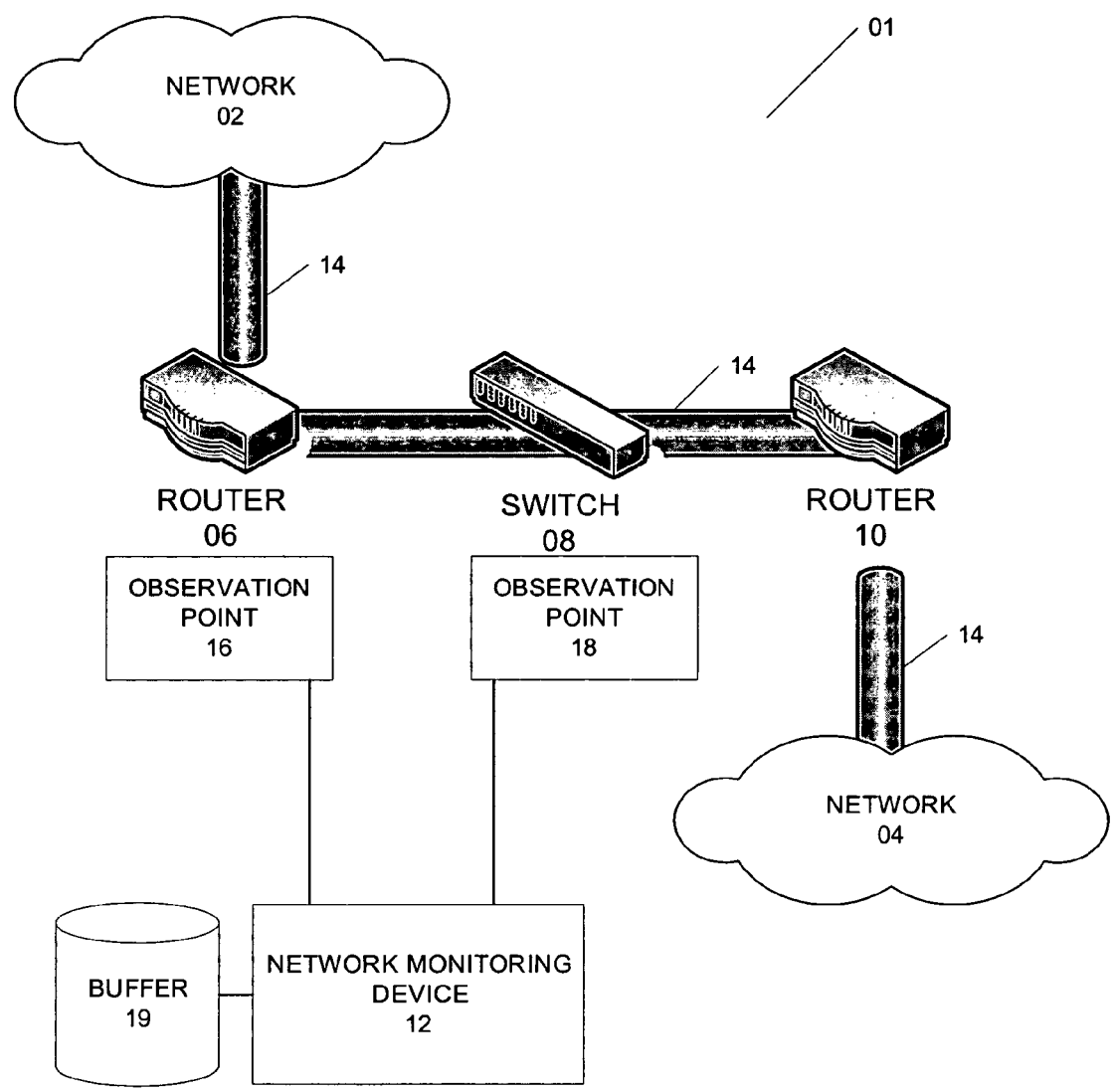
FIG. 1 illustrates an example of a network monitoring device deployed in accordance with an embodiment of the present invention so as to monitor flows between different entities in a network.

A scheme for identifying duplicate packets within a network (e.g., as collected at different monitoring points therein) is disclosed herein. Although discussed with reference to certain illustrated embodiments, upon review of this specification, those of ordinary skill in the art will recognize that the present scheme may find application in a variety of systems. Therefore, in the following description the illustrated embodiments should be regarded as exemplary only and should not be deemed to be limiting in scope. It should also be noted that as used herein the term "packet" is meant to broadly refer to packets, cells and other forms of information units used to transport data and/or control information within communications infrastructures (e.g., computer networks, telecommunications networks, data communication networks and the like, for example, the Internet) wherein resources are shared among multiple users and multiple information or traffic streams. The present techniques may be applied at per connection, per traffic streams or other level.

Various embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

In view of the above, it should be appreciated that some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, magnetic disks and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

FIG. 1 is a network diagram depicting a flow-based monitoring system 01 including multiple networks 02 and 04 according to one embodiment of the present invention. The networks 02 and 04 may be a single network or a network of networks. In addition, the networks 02 and 04 may represent virtual networks.

As illustrated, the networks 02 and 04 are connected via routers 06, 10 and switch 08. Flow 14 is an end-to-end conversation, such as a TCP or UDP conversation, across any network type between the networks 02 and 04. Flows may be monitored by collecting data packets as they pass through observation points 16 and 18 of the network monitoring device 12. It will be noted that a single or multiple observation points can be deployed according to the needs of a network operator. For example, multiple observation points may be preferred for ease of configuration. This allows the installation of the monitoring system into a pre-existing network without the need for reconfiguration. In addition, although FIG. 1 illustrates observation points 16 and 18 at different devices, router 06 and switch 08, it is possible to have multiple observation points 16 and 18 within the same device. For example, multiple observation points may be provided at the spanning port of the switch 08.

The multiple observation points may, however, introduce duplicate packets as the network monitoring device 12 collects packets from different observation points 16, 18. In addition, network problems such as latency or packet drops may cause TCP/IP protocol retransmission of packets. These are duplicate packets but will be differentiated here by identifying them as TCP retransmissions. The goal of this algorithm is to remove the duplicate packets but allow the TCP retransmissions to exist.

Duplicate packets may include packets which are exactly identical or nearly identical. A duplicate packet may be nearly identical when the difference is, for example, in only certain information contained in the packet header. Packet headers may be updated or modified as the packet transits through different network devices or networks of different protocols. For example, the TCP/IP header field TTL (Time-To-Live) is decremented as the packet transits through a routing device. In addition, a duplicate packet may be a few microseconds apart from its original packet, for example when the observation points are separated by very fast switching or routing devices.

According to one embodiment of the present invention, the network monitoring device 12 identifies the duplicate packets by comparing a new packet with a list of already received (historical) packets stored in buffer 19. The network monitoring device 12 may be presented with significantly different number of packets per second from one network to another. Therefore, the number of packets to be selected for comparison may vary considerably. For example, the network monitoring device 12 may need to consider ten thousand packets per second for an accurate comparison in a heavily utilized network. For a less utilized network, hundred of packets per second may be all that is required.

In one embodiment of the present invention, the number of packets selected for comparison is determined dynamically based on a packet arrival rate. In this context, the packet arrival rate is the number of packets that are being observed or received at one or all of the observation points 16, 18 over a period of time by the network monitoring device 12. The packet arrival rate reflects the network utilization and therefore, enables the network monitoring device 12 to dynamically consider only the appropriate set of existing packets for comparison. Stated differently, the received packets are stored in a queue of the buffer 19 and the size of the queue is based on the packet arrival rate. For example, if the packet arrival rate is 50 packets per ms, a queue size comprising 50 existing packets in the buffer 19 is selected for comparison. In another example, a packet arrival rate of 100 packets per ms will render 100 packets in the queue for comparison. Various algorithms may be used to derive the packet arrival rate and the packet arrival rate may be determined at a periodic interval or on a need basis.

In a further embodiment of the present invention, the packet arrival rate is further adjusted according to a threshold value. Basically, the threshold value is a variable parameter that can be adjusted to compensate for different network deployments. In particular, the threshold value varies the time period in which packets are selected for comparison. For example, instead of considering the number of packets received within 1 ms, a time period of 5 ms may be applied instead.

The threshold value is significant in determining the relevant number of packets to be selected for comparison. For example, a source may retransmit a packet in the event of a network problem such as dropped packets which may appear as a duplicate packet. The threshold value may be set to a value that identifies a retransmission time of the retransmitted packet or the TCP retransmission. Stated differently, the threshold value may be set to a value that separates a duplicate packet from a TCP retransmission. In general, a duplicate packet has a retransmission time of less than 1 ms while a TCP retransmission has a time of greater than 5 ms. In this case, the number of packets arrived over a time period of 5 ms may be computed or monitored. Therefore, existing packets which have a time period of more than 5 ms are automatically excluded.

Figure 2:
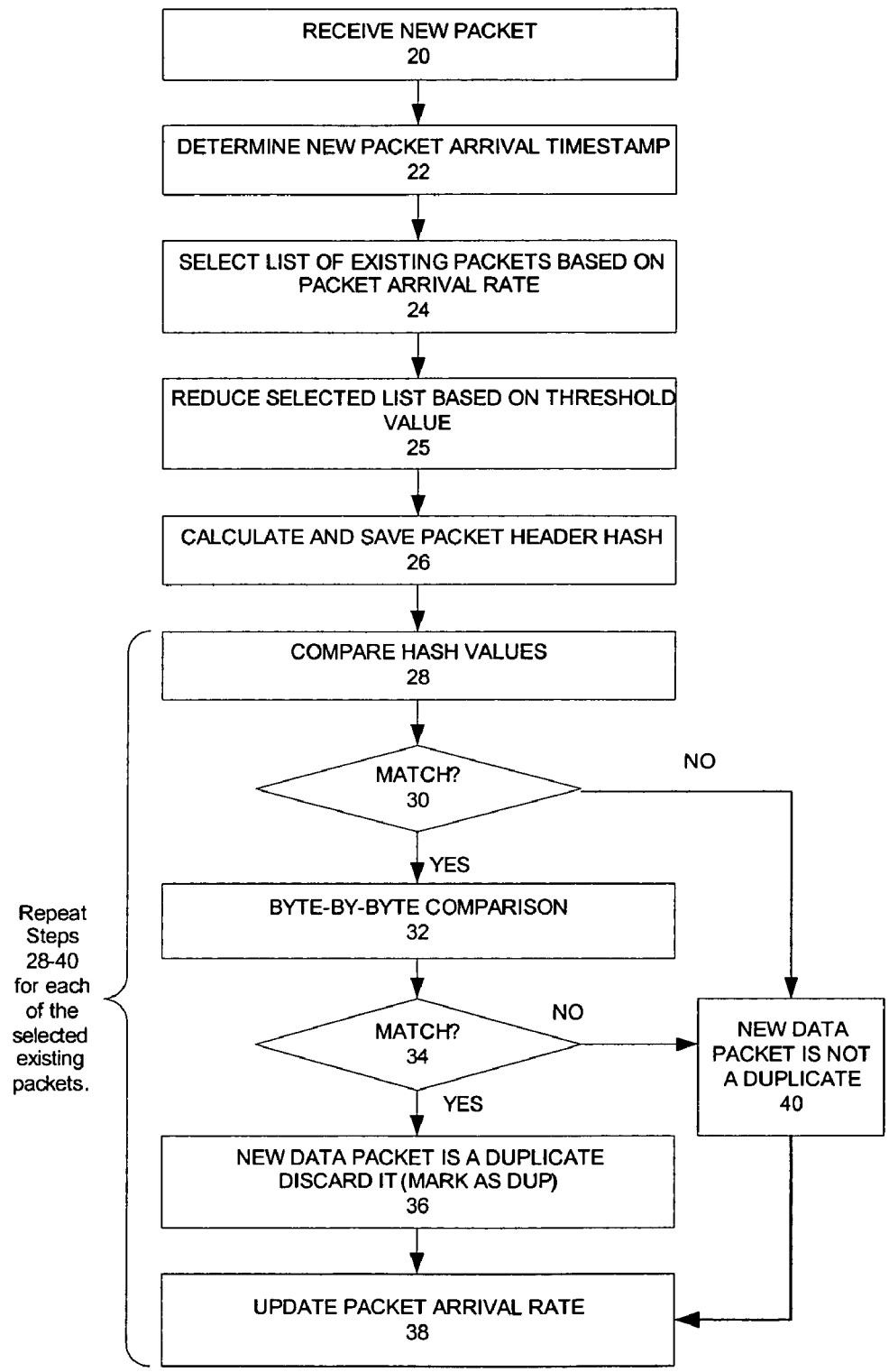
FIG. 2 is a flow diagram illustrating a process for identifying duplicate packets in accordance with an embodiment of the present invention.

Turning to FIG. 2, the process of identifying the duplicate packets begins at step 20 when the network monitoring device 12 receives a new data packet. In response, the network monitoring device 12 determines the arrival timestamp of the new data packet (step 22). Next, the network monitoring device 12 select from the buffer 19 existing packets that were within the packet arrival rate of a given threshold value (step 24). It will be noted that the comparison algorithm (steps 26-40) includes a two-level approach. The first level includes comparing packet headers to identify possible duplicates. In the event that a possible duplicate is identified, the second level is performed to provide a byte-by-byte comparison of the packet header. To further optimize the process, a hashing algorithm, such as CRC32, may be applied to calculate a hash value over the bytes in the packet headers (step 26). It will be noted that only appropriate fields in the packet headers are provided to the hashing and comparison algorithms. Header fields such as TTL (Time To Live), TOS (Type of Service) and Checksum are not considered for hashing or comparisons as such fields are being constantly updated as the packet transits through different network devices.

The hash values are compared (step 28) and a new packet is not a duplicate if the hash values do not match (step 40). However, if the hash values are identical, a byte-by-byte comparison of the packet header is performed (step 32) to verify the match. A successful byte-by-byte comparison of the packet header identifies the new packet as a duplicate (step 36). In addition, the packet arrival rate may be further adjusted to provide a different number of packets selected for the next round of comparison (step 38).

Thus a scheme for identifying duplicate packets in a flow-based network monitoring system has been described. Although in the foregoing specification, the present invention has been described with reference to specific exemplary embodiments thereof, it will be evident that various modifications may be made thereto without departing from the broader spirit and scope of the invention as set forth in the following claims. For example, one ordinary skill in the art will immediately recognized that the process of identifying the duplicate packets as illustrated in FIG. 2 may be further modified without affecting the objectives of the invention. For example, steps 24, 25 and 38 may be performed prior to the start of the process or at a different stage of the process. In another example, steps 24, 25 and 38 may be performed for each individual new packet received or for a plurality of new packet packets. Therefore, the specification and drawings are to be regarded in an illustrative sense rather than a restrictive sense.

What is claimed is:

1. A method for identifying a duplicate packet, the method comprising:
   collecting a plurality of received packets at a network monitoring device;
   storing a plurality of packet values corresponding to the plurality of received packets at the network monitoring device;
   determining, at the network monitoring device, a current packet arrival rate based on two or more of the plurality of received packets;
   receiving a new packet at the network monitoring device;
   comparing a new packet value corresponding to the new packet with each of a number of samples of the plurality of packet values at the network monitoring device, wherein the number of samples is determined based on the current packet arrival rate;
   determining, at the network monitoring device, whether the new packet is a duplicate based on the comparing.

2. The method of claim 1, wherein the number of samples corresponds to a determined number of packets received within a given time period.

3. The method of claim 2, wherein the time period is adjusted according to a threshold value.

4. The method of claim 3, wherein the threshold value is a variable parameter.

5. The method of claim 3, wherein the threshold value is a time value that is less than a retransmission time of a TCP retransmitted packet.

6. The method of claim 1, wherein the comparing includes performing a hash value comparison of a header of the new packet prior to a byte-by-byte comparison of the header.

7. The method of claim 6, wherein performing the hash value comparison includes calculating and comparing a first hash value and second hash value, the first and second hash values based on header information of the new packet and header information of each sample of the plurality of packet values, respectively.

8. The method of claim 7, including performing the byte-by-byte comparison of the header of the new packet and the header of the received packet when the first hash value corresponds to the second hash value.

9. The method of claim 8, wherein the new packet is determined to be the duplicate in response to a successful byte-by-byte comparison.

10. A network monitoring device configured to:
    collect a plurality of packets from one or more observation points of a network,
    store a plurality of packet values corresponding to the plurality of received packets in a buffer,
    determine a current packet arrival rate based on two or more of the plurality of packets, collect a new packet,
    compare a new packet value corresponding to the new packet with each of a number of samples of the plurality of packet values, wherein the number of samples is determined based on the current packet arrival rate; and
    determine, based on the comparison, whether the new packet is a duplicate packet.

11. The network monitoring device of claim 10, wherein the number of samples corresponds to a number of packets received within a defined time period.

12. The network monitoring device of claim 11, wherein the time period is adjusted according to a threshold value.

13. The network monitoring device of claim 12, wherein the threshold value is a variable parameter.

14. The network monitoring device of claim 12, wherein the threshold value is a time value that is less than a retransmission time of a TCP retransmitted packet.

15. The network monitoring device of claim 10, wherein the monitoring device is configured to perform a hash value comparison of headers of the new packet and the received packet prior to a byte-by-byte comparison of the headers.

16. The network monitoring device of claim 15, wherein the network monitoring device is configured to perform the hash value comparison by calculating and comparing a first hash value and second hash value, the first and second hash values being based on header information of the new packet and header information of each sample of the plurality of packet values, respectively.

17. The network monitoring device of claim 16, wherein the network monitoring device is configured to perform the byte-by-byte comparison of the headers of the new packet and the received packet when the first hash value corresponds to the second hash value.

18. The network monitoring device of claim 17, wherein the network monitoring device is configured to identify the new packet as a duplicate packet in response to a successful byte-by-byte comparison.

19. A network monitoring device configured to:
collect a plurality of received packets from one or more observation points of a network,
store a queue of packet values corresponding to the plurality of received packets in an order in which the received packets are collected,
determine a current packet arrival rate based on the plurality of received packets,
determine a number of samples based on the current packet arrival rate,
collect a new packet, compare a new packet value of the new packet with each packet value of the queue of packet values until at least one stop limit of a plurality of stop limits is reached, wherein the plurality of stop limits includes a first stop limit of finding a matching packet value in the queue of packet values that corresponds to the new packet value, and a second stop limit of comparing the new packet value with the number of samples of the queue of packet values, and
determine, based on the comparison, whether the new packet is a duplicate packet.

20. The network monitoring device of claim 19, wherein the number of samples corresponds to a number of packets received within a given time period.

21. The network monitoring device of claim 20, wherein the time period is adjusted according to a threshold value.

22. The network monitoring device of claim 21, wherein the threshold value is a variable parameter.

23. The network monitoring device of claim 21, wherein the threshold value is a time value that is less than a retransmission time of a TCP retransmitted packet.

24. The network monitoring device of claim 19, wherein the network monitoring device is configured to compare the new packet value with each packet value of the queue of packet values by:
comparing a hash value of the new packet value with a hash value of each packet value, and,
if a matching hash value is found, comparing each byte of the new packet value to each byte of the packet value corresponding to the matching hash value.

25. The network monitoring device of claim 19, wherein the network monitoring device is configured to store the new packet value in the queue of packet values if the new packet is not a duplicate packet.

26. The network monitoring device of claim 19, wherein the network monitoring device is configured with a maximum queue size for storing the queue of packet values, and the number of samples is less than the maximum queue size.

* * * * *